United States Patent Office 3,830,774
Patented Aug. 20, 1974

3,830,774
CARBON BLACK REINFORCED
RUBBER COMPOSITIONS
Merrill E. Jordan, Walpole, William G. Burbine, Whitman, and Frank R. Williams, Quincy, Mass., assignors to Cabot Corporation, Boston, Mass.
No Drawing. Continuation of abandoned application Ser. No. 140,980, May 6, 1971. This application Feb. 16, 1973, Ser. No. 333,196
The portion of the term of the patent subsequent to Apr. 3, 1990, has been disclaimed
Int. Cl. C08c 11/18
U.S. Cl. 260—42.46                    10 Claims

ABSTRACT OF THE DISCLOSURE

This disclosure relates to the use of a certain novel class of carbon black products possessing usually high tinting strengths as reinforcing additives in the preparation of natural and synthetic rubber compositions having improved reinforcement properties.

This application is a continuation-in-part of U.S. Application Ser. No. 140,980, filed May 6, 1971, and now abandoned.

This invention relates to new and useful natural and synthetic rubber compositions. In particular this invention relates to new and improved rubber compositions comprising a natural or synthetic rubber and a certain novel class of carbon black products possessing usually high tinting strengths which improve the physical properties of the rubber to which it is added.

Normally, there have been widely employed as fillers and reinforcing pigments in the compounding and preparation of rubber compositions various conventional carbon blacks known heretofore. Ordinarily, the conventional carbon blacks are effective in the preparation of rubber vulcanizates having improved reinforced properties such as tensile strength, modulus and treadwear. The improvement in properties exhibited by an elastomeric article or rubber stock filled with a carbon black will depend to a great extent upon the type of elastomer utilized and the particular carbon black incorporated therein. It has now been made possible by using the carbon black products of the present invention to provide finished products having still further improved tensile strength, modulus, abrasion-resistance and treadwear.

Accordingly, it is a principal object of this invention to provide improved natural and synthetic rubber compositions.

It is a further object of this invention to provide a suitable carbon black reinforcing additive for natural and synthetic rubbers which provides the desired properties to the resultant composition.

Other objects and advantages of the present invention will be apparent to those skilled in the art from the following detailed description and claims.

In accordance with this invention, it has been found that the above and still further objects are accomplished by incorporating a natural or synthetic rubber with a certain class of novel carbon black products having a unique relationship between tinting strengths, structure and surface area.

Generally, amounts of the novel carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

The rubbers for which the novel carbon blacks of this invention are effective as reinforcing agents include natural rubber and synthetic rubbers. Among the rubbers suitable for use with the present invention are natural rubber and its derivatives such as chlorinated rubber; copolymers of from about 10 to about 70 percent by weight of styrene and from about 90 to about 30 percent by weight of butadiene such as a copolymer of 10 parts styrene and 90 parts butadiene, a copolymer of 29 parts styrene and 81 parts butadiene, a copolymer of 23.5 parts styrene and 76.5 parts butadiene, a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinylpyridine. 5 - methyl - 2-vinylpyridine,5-ethyl-2-vinylpyridine, 2 - methyl - 5 - vinylpyridine, alkyl-substituted acrylates such as methyl acrylate, ethyl acrylate, alkyl-substituted methacrylates such as methyl methacrylate, ethyl methacrylate, ethyl vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

The reinforcing agents utilized in the rubber compositions of the present invention include a class of novel carbon blacks prepared by a furnace process which are not aftertreated and are further characterized by having a tinting strength of at least about 200, as determined on pelletized carbon blacks, a value for the relationship of [tinting strength+0.6($D_a$)] of at least about 317, and a pH of at least 4.0. In this relationship, $D_a$, the apparent diameter, is defined as the diameter, in millimicrons, of a solid carbon sphere containing the same amount of carbon as the average amount of carbon per agglomerate in a paper by Avrom I. Medalia and L. Willard Richards entitled "Tinting Strength of Carbon Black" presented to the American Chemical Society, Division of Coatings and Plastic Chemistry, Toronto, Canada, May 1970. The apparent diameter, $D_a$, is readily obtained from the calculation [2270+63.5)DBP]/Iodine Surface Area. In a preferred embodiment of the present invention, the novel carbon black products are characterized by having a tinting strength ranging from about 220 to about 290 and in a still further preferred embodiment tinting strengths ranging from about 230 to about 275. Furthermore, in another preferred embodiment of the present invention, the novel carbon black products possess a value for the relationship of [tinting strength+0.6($D_a$)] of at least about 320.

The heretofore-described novel group of carbon black products can be readily prepared by contacting a carbon black-yielding feedstock with a stream of hot combustion gases flowing at an average linear velocity of at least 100 feet per second. The process for preparing the novel carbon blacks of the present invention will be described in greater detail hereinafter.

In the preparation of the hot combustion gases employed in preparing the novel type of carbon black products of the present invention there are reacted in any conventional combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, kerosene. It is generally preferred, however, to utilize fuels having a high content of carbon-containing components, and, in particular, hydrocarbons. For example, streams rich in methane such as natural gas and modified or enriched natural gas are excellent fuels as well as other streams containing high amounts of hydrocarbons such as various petroleum gases and liquids and refinery by-products including ethane, propane, butane and pentane fraction, fuel oils and the like. The carbon black products of the present invention are prepared by reacting the aforementioned combustion reaction products with any of a wide variety of hydrocarbon feedstocks.

Accordingly, in greater detail, the novel carbon black products are prepared by reacting a carbon black-yielding hydrocarbon feedstock with hot gaseous products of an initial combustion reaction which are flowing at a high linear velocity in a suitable reaction zone. The hot combustion gases are readily generated by contacting a combustible fuel with an amount of oxidant, such as air or oxygen, which, if desired, may be preheated varying from about 50 to about 500 percent of the amount required for complete combustion of the combustible fuel to the desired hot gaseous products in any type of conventionally known burner designed to produce a stream of hot combustion gases flowing at a high linear velocity. It is, furthermore, desirable that there be a pressure differential between the combustion chamber and the reaction chamber of at least 1.0 p.s.i., and more preferably, of about 1.5 to about 10 p.s.i. Under these conditions, there is produced a stream of gaseous combustion products possessing sufficient energy to convert a carbon black-yielding hydrocarbon feedstock to the desired carbon black products. The resultant combustion gases emanating from the combustion zone attain temperatures of at least about 2400° F., with the most preferable temperatures being at least about 3000° F. The hot combustion gases flow in a downstream direction at a high linear velocity which may be effecuated by passing the combustion gases through any suitable passage or inlet which may optionally be tapered or restricted such as a conventional venturi throat. There is then introduced into the stream of hot combustion gases traveling at a high velocity at a point where there exists a pressure differential between the combustion chamber and the reaction chamber of above about 1.0 p.s.i., a suitable carbon black-yielding hydrocarbon feedstock thereby insuring a high rate of mixing and shearing of the hot combustion gases and the hydrocarbon feedstock so as to rapidly and completely decompose and convert the feedstock to the novel carbon blacks in high yields. The hydrocarbon feedstock is injected substantially transversely from the periphery of the stream of hot combustion gases in the form of a single or preferably a plurality of small, coherent jets which penetrate into the interior regions of the stream of combustion gases. The amount of feedstock utilized will be adjusted in relation to the amounts of fuel and oxidant employed so as to result in an overall percent combustion for the process ranging from about 15 to about 60 percent and, preferably, from about 20 to about 50 percent. Following the period of reaction in the reaction zone, which may vary from about 1 to about 100 milliseconds, or even shorter periods of time, the effluent gases containing the desired carbon black products suspended therein are passed downstream to any conventional cooling and separating means whereby the carbon blacks are recovered. The separation of the carbon black from the gas stream is readily accomplished by conventional means such as a precipitator, cyclone separator and bag filter.

The following testing procedures are used in the determination and evaluation of the physical properties and efficiency of the carbon blacks of the present invention.

DBP Absorption.—In accordance with the procedure set forth in ASTM D-2414-65T, now designated as ASTM D-2414-70, absorption characteristics of pelleted carbon blacks are determined. In brief, the test procedure entails adding dibutyl phthalate (DBP) to a pelleted carbon black until there occurs a transition from a free-flowing powder to a semi-plastic agglomerate. The value is expressed as cubic centimeters (cc.) of dibutyl phthalate (DBP) per 100 grams of carbon black.

Iodine Surface Area.—The surface area of pelletized carbon black products is determined in accordance with the following iodine adsorption technique. In this procedure, a carbon black sample is placed into a porcelain crucible equipped with a loose-fitting cover to permit escape of gases and is devolatilized for a seven-minute period at a temperature of 1700° F. in a muffle furnace and then allowed to cool. The top layer of calcined carbon black is discarded to a depth of one fourth inch and a portion of the remaining black is weighed. To this sample there is added a 100 milliliter portion of 0.01 N iodine solution and the resulting mixture is agitated for 30 minutes. A 50-milliliter aliquot of the mixture is then centrifuged until the solution is clear, following which 40 milliliters thereof is titrated, using a 1% soluble starch solution as an end point indicator, with 0.01 N sodium thiosulfate solution until the free iodine is adsorbed. The percent of iodine adsorbed is determined quantitatively by titrating a blank sample. Finally, the iodine surface area expressed in square meters per gram is calculated in accordance with the formula $$\frac{(\text{Percent Iodine Adsorbed} \times 0.937) - 4.5}{\text{Sample Weight}} = \text{Iodine Surface Area}$$

This procedure for determining iodine surface areas of carbon black pellets is designated as Cabot Test Procedure No. 23.1 for purposes of convenience inasmuch as there is still no official ASTM designation. As shown in a Cabot Corporation publication TG-70-1 entitled "Industry Reference Black No. 3" by Messrs. Juengel and O'Brien published on Apr. 1, 1970, the iodine surface area of IRN No. 3 (Industry Reference Black No. 3) is 66.5 m.$^2$/g. as determined in accordance with Cabot Test Procedure 23.1 referred to hereinabove.

Tinting Strength.—Tinting strength represents the relative covering power of a pelletized carbon black when incorporated in a 1 to 37.5 weight ratio with a standard zinc oxide (Florence Green Seal No. 8 made and sold by New Jersey Zinc Co.), dispersed in an epoxidized soybean oil type plasticizer (Paraplex G-62 made and sold by Rohm and Haas Co.) and compared to a series of standard reference blacks tested under the same conditions. More particularly, the test involves mulling carbon black, zinc oxide, and plasticizer, in such proportions that the resulting ratio of carbon black to zinc oxide is 1 to 37.5. Reflectance measurements utilizing a Welch Densichron apparatus are then obtained from a film case on a glass plate and readings are compared to carbon black standards having known tinting strengths. The tinting strengths of the carbon black standards are determined utilizing an arbitrarily assigned value of 100% for the tinting strength of the Cabot standard SRF carbon black. In this instance, as is conventionally done, the standard SRF carbon black arbitrarily assigned a value of 100% for tinting strength is Sterling S or Sterling R semi-reinforcing furnace black made by Cabot Corporation. Each of the Sterling R or Sterling S reference blacks is characterized by having, among other properties, a BET nitrogen surface area of about 23 m.$^2$/g., an oil absorption of about 65 to 70 lbs. oil/100 lbs. black, and an average particle diameter of about 800 angstroms as determined by electron microscopy. The only difference is that Sterling R carbon black is in a fluffy form while the Sterling S carbon black is in pelleted form. Accordingly, the black selected for reference purposes then is determined by the state of the blacks' to be measured for tinting strengths. The Sterling R or Sterling S semi-reinforcing carbon black is thus considered as the primary reference standard for determining tinting strengths of the other blacks.

Furthermore, as described above, additional carbon blacks are utilized as references for establishing tinting strength values covering the range of about 30% to about 250 percent. These are determined relative to the primary standard having the arbitrarily assigned value of 100% for tinting strength. In this manner, a series of blacks having a wide range of tinting strengths is made available so as to provide reference blacks that approximate as closely as possible the black to be measured. Exemplary carbon blacks employed as auxiliary tinting strength standards for purposes of the above procedure include the following blacks made by Cabot Corporation. The analyticals are determined in accordance with the test procedures set forth in the present application.

| Analytical properties | Sterling MT [1] | Sterling FT [2] | Vulcan 6H | Vulcan 9 |
|---|---|---|---|---|
| Tinting strength, percent | 31 | 56 | 220 | 252 |
| Iodine surface area, m.$^2$/g | 5.0 | 8.4 | 109.6 | 118.5 |
| DBP Absorption, cc./100 g | 33.6 | 35.9 | 131.4 | 116.9 |

[1] Medium thermal.
[2] Fine thermal.

For purposes of reference, the tinting strength of IRB No. 3 as determined in accordance with the above procedure is 208% of the primary Sterling S semi-reinforcing black. This is also disclosed in the earlier mentioned publication on Industry Reference Black No. 3 by Messrs. Juengel and O'Brien.

Roadwear Rating.—The procedure for measuring and evaluating roadwear or treadwear is well known to the art and is completely described in Cabot Corporation's Technical Service Report No. TG-67-1 on "The Use of Multi-Section Treads in Tire Testing" by Fred E. Jones (1967). It is to be noted that, as in the case of any procedure for measuring wear ratings, the evaluations are made relative to a standard reference black which is arbitrarily assigned a wear rating value of 100 percent. In this instance, the black selected as the reference standard for evaluating roadwear is an ISAF (intermediate super abrasion furnace) type black, having an ASTM designation of N-220, made by Cabot Corporation and further characterized by having a tinting strength of 232%, an iodine surface area of 97.9 m.$^2$/g., a DBP absorption of 114.9 cc./100 g., and a density of 22.2 lbs./cu. ft. For ease of reference, this treadwear reference black is described as Cabot's ISAF type reference black No. D-6607. The above method for determining relative wear ratings of treadstocks is preferred to the use of laboratory tests for measuring abrasion since it is known to be difficult to extrapolate such results to actual performance. Accordingly, the roadwear results shown herein reflect accurately the performance of treadstocks relative to Cabot's standard ISAF type black No. D-6607 having an arbitrarily assigned value of 100 percent.

In carrying out the above roadwear evaluations there is used the following formulation of ingredients, expressed in parts by weight, which are admixed by means of a Banbury mill.

| Ingredient: | Parts by weight |
|---|---|
| Styrene-butadiene | 89.38 |
| Cis-4 - polybutadiene | 35 |
| Carbon black | 75 |
| Sundex 790 | 25.62 |
| Zinc oxide | 3 |
| Sunproof Improved | 2.5 |
| Wingstay 100 | 2 |
| Stearic acid | 2 |
| Santocure (CBS) | 1.4 |
| Sulfur | 1.75 |

With regard to the foregoing formulation for use in road tests, designated hereinafter as RTF-1, Santocure (CBS) is the trade designation for N-cyclohexyl-2-benzothiazole-sulfenamide, a curing agent for rubber systems; Sundex 790 is the trade name for a plasticizer sold by Sun Oil Company; Sunproof Improved is the trade name for an antiozonant sold by Uniroyal Chemical Company; and Wingstay 100 is the trade name for a stabilizer comprising mixed diaryl-p-phenylene diamines sold by Goodyear Tire and Rubber Company.

Rebound.—This is determined in accordance with the procedure set forth in ASTM D-1054-66.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this example, there is employed a suitable reaction apparatus provided with means for supplying the combustion gas-producing reactants, i.e., a fuel and an oxidant stream, either as separate streams or as pre-combusted gaseous reaction products, and also means for supplying the carbon black-yielding hydrocarbon feedstock to the apparatus. The apparatus may be constructed of any suitable material such as metal and either provided with a refractory insulation or surrounded by means for cooling such as recirculating liquid which is preferably water. Additionally, the reaction apparatus is equipped with temperature and pressure recording means, means for quenching the carbon black-forming reaction such as spray nozzles, means for cooling the carbon black product and means for separating and recovering the carbon black from other undesired by-products. Accordingly, in carrying out the present process for preparing the novel carbon blacks, the following procedure is employed. In order to obtain the desired flame, there are charged into a combustion zone of the apparatus through one or more inlets air preheated to a temperautre of 750° F. at a rate of 330,000 s.c.f.h. and natural gas at a rate of 23,500 s.c.f.h. thereby generating a stream of combustion gases flowing in downstream direction at a high linear velocity which possesses a kinetic head of at least 1.0 p.s.i. greater than the pressure of the reaction chamber. Accordingly, in a preferred embodiment of the present invention, the rapidly flowing stream of combustion gases is passed through a constricted or tapered portion of the apparatus having a fixed cross section or throat such as a conventional venturi throat in order to increase the linear velocity of the stream of combustion gases. There is then introduced transversely into the resultant stream of hot combustion gases having the desired kinetic head a carbon black-yielding hydrocarbon feedstock under a pressure of 280 p.s.i. through one or more passages or inlets located peripherally to the stream of combustion gases at a rate of 490 gallons per hour. The hydrocarbon feedstock employed is Gulf Oil which is a fuel having a carbon content of 90.3% by weight, a hydrogen content of 7.9% by weight, a sulfur content of 1.9% by weight, a hydrogen to carbon ratio of 1.04, a B.M.C.I. Correlation Index of 126, a specific gravity in accordance with ASTM D-287 of 1.07, an API gravity in accordance with ASTM D-287 of 0.4, an SSU viscosity (ASTM D-88) at 130° F. of 95.2, an SSU viscosity (ASTM D-88) at 210° F. of 40.0 and an asphaltenes content of 2.5 percent. There is further added to the reaction zone 9.1 grams of potassium chloride for each 100 gallons of fuel utilized. The reaction conditions used in this instance are such as to provide an overall combustion of 33.3 percent. The carbon black-forming reaction is then quenched with water to a temperautre of 1250 to 1300° F. in a separate zone downstream of the reaction zone and the resultant carbon black-containing gases are subjected to the conventional steps of cooling, separation and recovery of the carbon black product. The carbon black product thus obtained is characterized by having a tinting strength of 268, an iodine surface area of 101, a DBP absorption value of 115, a pH of 8.2, an apparent diameter, $D_a$, of 95, a value for the relationship of [tinting strength+$0.6(D_a)$] of 325.

EXAMPLE 2

A suitable reaction apparatus as described in Example 1 is charged with air preheated to 760° F. at a rate of 350,000 s.c.f.h. and natural gas at a rate of 24,650 s.c.f.h. in order to produce a suitable flame for carrying out the reaction. To the downstream-flowing combustion gases which have been passed through a constricted or tapered portion of the apparatus there is then fed the Gulf Oil hydrocarbon feedstock under a pressure of 315 p.si.g. and at a rate of 374 gallons per hour. Potassium chloride is introduced in an amount of 6 grams per 100 grams fuel. In this run, the reaction conditions are maintained in a manner such as to provide an overall combustion of 42.3 percent and the reaction is quenched with water to a temperature of about 1400° F. At the conclusion of the reaction there is produced a carbon black product having a tinting strength of 275, an iodine surface area of 116 square meters per gram, a DBP absorption value of 112, an apparent diameter, $D_a$, of 81, a value for the relationship [tinting strength+$0.6(D_a)$] of 323, and a pH value of 6.0.

EXAMPLE 3

Following the procedure of Example 1 there are charged to a combustion zone a stream of air at a temperature of 750° F. at a rate of 299,000 s.c.f.h. and a stream of natural gas at a rate of 21,400 s.c.f.h. to produce the desired flame. Into the gaseous products of the combustion reaction there is fed under a pressure of 305 p.s.i.g. as the hydrocarbon feedstock Gulf Oil at a rate of 510 gallons per hour and the reaction conditions are maintained so as to produce an overall combustion of 29.8 percent. During the preparation of the carbon black of this example, potassium chloride is added in an amount of 3 grams per 100 grams of fuel oil and the quench is carried out using water so as to maintain a temperature of approximately 1250 to 1300° F. The resultant carbon black product is characterized by having a tinting strength of 252, an iodine surface area of 81 square meters per gram, a DBP absorption value of 123, an apparent diameter, $D_a$, of 124, a value for the relationship [tinting strength+$0.6(D_a)$] of 327, and a pH of 9.0.

EXAMPLE 4

In accordance with the procedure of Example 1, air preheated to 800° F. at a rate of 340,000 s.c.f.h. and natural gas at a rate of 25,600 s.c.f.h. are fed into the combination zone of the reaction apparatus. To the resultant downstream flow of hot combustion gases there is charged Gulf Oil hydrocarbon feedstock under a pressure of 200 p.s.i.g. at a rate of 547 gallons per hour. The reaction is carried out at an overall combustion of 30.7 percent and the quenching water is maintained at 1300° F. There is obtained a carbon black product having a tinting strength of 235, an iodine surface area of 72, a DBP absorption value of 131, an apparent diameter, $D_a$, of 147, a value for the relationship [tinting strength+$0.6(D_a)$] of 323, and a pH value of 8.1.

EXAMPLE 5

According to the procedure of Example 1, oxygen at a rate of 200 s.c.f.h. and natural gas at a rate of 775 s.c.f.h. are fed into the combustion zone of the reaction apparatus until the desired flame is produced. To the downstream flow of hot gaseous products of the combustion reaction there is introduced a hydrocarbon feedstock at a rate of 13.3 gallons per hour. The hydrocarbon feedstock utilized is Sunray DX as described hereinbelow. The reaction is carried out at an overall combustion of 33.3 percent. Sunray DX is a fuel having a carbon content of 91.1% by weight, a hydrogen content of 7.9% by weight, a sulfur content of 1.3% by weight, a hydrogen to carbon ratio of 1.04, a B.M.C.I. Correlation Index of 133, a specific gravity in accordance with ASTM D–287 of 1.09, an API gravity in accordance with ASTM D–287 of −2.6, an SSU viscosity (ASTM D–88) at 130° F. of 350, an SSU viscosity (ASTM D–88) at 210° F. of 58 and an asphaltenes content of 5.7 percent. The resultant carbon black product is characterized by having an iodine surface area of 127 m.²/gm., a DBP absorption value of 215, a tinting strength of 247, a pH of 8.1, an apparent diameter, $D_a$, of 125, and a value for

[tinting strength+$0.6(D_a)$]

of 322.

EXAMPLE 6

Following the procedure of Example 1, there are introduced into the combustion zone of the apparatus oxygen at a rate of 2000 s.c.f.h. and natural gas at a rate of 625 s.c.f.h. in order to produce the desired flame. Into the flow of hot combustion gases emanating from the combustion zone, there is then charged, as the hydrocarbon feedstock, Sunray DX at a rate of 16.1 gallons per hour. The reaction is carried out at a combustion of 30.1 percent. The resultant carbon black product has an iodine surface area of 136 m.²/gm., a DBP absorption value of 157, a tinting strength of 268, a pH of 7.4, an apparent diameter, $D_a$, of 90, and a value for

[tinting strength+$0.6(D_a)$]

of 322.

EXAMPLE 7

In accordance with the procedure of Example 1, air which has been preheated to 700° F. is charged into the combustion zone of the apparatus at a rate of 85,000 s.c.f.h. together with natural gas at a rate of 7730 s.c.f.h. in order to create the desired environment. Into the resultant downstream flow of hot combustion gases there is charged Shamrock Oil hydrocarbon feedstock under a pressure of 315 p.s.i.g. at a rate of 130 gallons per hour. The Shamrock feedstock is a fuel having a carbon content of 91.2%, a hydrogen content of 8.3%, a sulfur content of 0.5%, a hydrogen to carbon ratio of 1.08, a B.M.C.I. Correlation Index of 116, a specific gravity of 1.06 (ASTM D–287), an API gravity in accordance with ASTM D–287 of 1.8, an SSU viscosity (ASTM D–88) at 130° F. of 247, an SSU viscosity (ASTM D–88) at 210° F. of 54.2, and an asphaltenes content of 7.2 percent. The reaction is carried out at an overall combustion of 31% and the resulting HAF-HS type black is produced in good yield. The resulting black has an iodine surface area of 72 m.²/g., a tinting strength of 242%, a DBP absorption value of 142 cc./100 g., an apparent diameter, $D_a$, of 156.8, and a value for

[tinting strength+$0.6(D_a)$]

of 336.1.

EXAMPLE 8

In accordance with the procedure of Example 7, there are charged into the combustion zone air preheated to 700° F. at a rate of 85,000 s.c.f.h. and natural gas at a rate of 7730 s.c.f.h. Shamrock feul described hereinabove under a pressure of 323 p.s.i.g. is introduced through eight openings of 0.025 inch in size, from the periphery into the extremely fast flowing combustion gases at a rate of 103 gallons per hour and the reaction is operated at an overall combustion of 36.5%. The resulting black which is obtained in good yield and is of the ISAF-HS type, is characterized by having an iodine surface area of 99 m.²/ g., a tinting strength of 267%, a DBP absorption value of 144 cc./100 g., an apparent diameter, $D_a$, of 115.3, and a value for [tinting strength+0.6($D_a$)] of 336.2.

EXAMPLE 9

Following the procedure of Example 7, air preheated to a temperature of 700° F. is introduced at a rate of 100,000 s.c.f.h. into the combustion zone together with natural gas at a rate of 9090 s.c.f.h. to produce the desired combustion gases. Into the resultant downstream flow hot combustion gases there is charged Shamrock fuel as described herein under a pressure of 321 p.s.i.g. at a rate of 114 gallons per hour and the reaction is accomplished at an overall combustion of 38.3 percent. The black obtained hereby is of the SAF-HS type (high structure, super abrasion furnace black) and is further characterized by having an iodine surface area of 119.7 m.²/g., a tinting strength of 295%, a DBP absorption value of 137.2 cc./100 g., an apparent diameter, $D_a$, of 91.7, and a value for [tinting strength+0.6($D_a$)] of 350.

The rubber compositions of this invention are readily prepared by conventional mechanical methods. For example, the rubber and the carbon black reinforcing agent are intimately admixed together on a conventional mixing machine of the type normally used for mixing rubber or plastics such as a Banbury mixer and/or a roll mill in order to insure satisfactory dispersion. The rubber compositions are compounded according to standard industry formulations for both natural rubber and synthetic rubber-containing formulations.

In the following examples there is demonstrated the advantageous and unexpected results achieved by the use of the carbon black products described hereinabove as additives in rubber formulations. It will, of course, be apparent that the examples, while being illustrative of the present invention, should not be construed as limiting or restrictive in any way.

EXAMPLE 10

On a conventional roll mill there are mixed to a homogeneous blend 100 parts by weight of natural rubber, 5 parts by weight of zinc oxide, 3 parts by weight of stearic acid, 2.5 parts by weight of sulfur, 0.6 parts by weight of mercaptobenzothiazyl disulfide (MBTS) and 50 parts by weight of the carbon black prepared in accordance with Example 1. The resulting compound is subsequently cured at 293° F. for a period of 30 minutes. A determination of properties of the vulcanizate gives a value of 49.5 for Mooney viscosity ML–4' at 250° F., a tensile strength of 4560 p.s.i., a 300% modulus of 2660 p.s.i., an elongation of 495%, and a Shore hardness of 73. Utilizing the Goodyear-Healey rebound pendulum in accordance with ASTM Test Method D–1054–66, the percentage rebound is determined to be 63.2.

EXAMPLE 11

Following the procedure of Example 10 and using in lieu of the carbon black employed therein, 50 parts by weight of the carbon black of Example 2, there is obtained a compound having a 300% modulus of 2110 p.s.i., a tensile strength of 4240 p.s.i., an elongation of 540%, a Shore A hardness of 65.5, a Mooney viscosity ML–4' at 250° F. of 44.9 and a percentage rebound of 60.5.

EXAMPLE 12

Following the procedure of Example 10 and substituting 50 parts by weight of the carbon black of Example 3 for the black used therein, a vulcanizate is prepared. Results on this vulcanizate include a tensile strength of 4280 p.s.i., a 300% modulus of 2840 p.s.i., an elongation of 440%, a Shore A hardness of 72.5, a Mooney viscosity ML–4' at 250° F. of 46.9, and a percentage rebound of 65.3.

EXAMPLE 13

In accordance with the procedure of Example 10, a vulcanizate is prepared utilizing 50 parts by weight of the carbon black of Example 4. Testing of the vulcanizate reveals a 300% modulus of 2820 p.s.i., a tensile strength of 4030 p.s.i., an elongation of 420 percent, a Shore A hardness of 68, a Mooney viscosity ML–4' at 250° F. of 46.5 and a percentage rebound of 66.7.

EXAMPLE 14

Utilizing 50 parts by weight of carbon black prepared as shown in Example 5, a rubber vulcanizate is produced according to the procedure of Example 10. The vulcanizate obtained possesses a 300% modulus of 2260 p.s.i., a tensile strength of 2800 p.s.i., an elongation of 360%, a Shore A hardness of 71, a Mooney viscosity ML–4' at 250° F. of 56 and a percentage rebound of 51.3.

EXAMPLE 15

Following the procedure of Example 10, there is prepared a rubber vulcanizate using in place of the carbon black employed therein, 50 parts by weight of the carbon black of Example 6. The vulcanizate is characterized by having a 300% modulus of 2450 p.s.i., a tensile strength of 3380 p.s.i., an elongation of 380%, a Shore A hardness of 67, a Mooney viscosity ML–4' at 212° F. of 91, and a percentage rebound of 57.6.

EXAMPLE 16

In accordance with the procedure of Example 10, a rubber vulcanizate is prepared using the black of Example 7. The vulcanizate is found to possess a 300% modulus of 2810 p.s.i. and a tensile strength of 4157 p.s.i.

EXAMPLE 17

Following the procedure of Example 10 and substituting the black of Example 8 in preparing the rubber vulcanizate, the properties obtained thereon are a 300% modulus of 2780 p.s.i. and a tensile strength of 4407 p.s.i The black used in this formulation as shown earlier is an ISAF high structure type.

EXAMPLE 18

Utilizing the black of Example 9, a rubber vulcanizate is prepared according to the procedure of Example 10. The vulcanizate is characterized by having a 300% modulus of 2525 p.s.i. and a tensile strength of 4397 p.s.i.

EXAMPLE 19

One hundred parts by weight of a copolymer of 23.5 parts styrene and 76.5 parts butadiene, 1.5 parts by weight of stearic acid, 5 parts by weight of zinc oxide, 2 parts by weight of mercaptobenzothiazyl disulfide (MBTS), 2 parts by weight of sulfur and 50 parts by weight of the carbon black product described in Example 1 are mixed on a roll mill to a homogeneous blend. The resulting compound is then cured at 293° F. for a period of 50 minutes. Testing of the blend for conventional rubber properties reveals a value for Mooney viscosity ML–4' at 212° F. of 88, a tensile strength of 4980 p.s.i., a 300% modulus of 2360 p.s.i., an elongation of 540% and a Shore A hardness of 74. Furthermore, utilizing the Goodyear-Healey rebound pendulum, it is determined that the percentage rebound is 53.4.

EXAMPLE 20

Following the procedure of Example 19 and using for the carbon black employed therein a carbon black as prepared in Example 2, there is obtained a cured rubber vulcanizate. The results obtained on this vulcanizate show a 300% modulus of 2410 p.s.i., a tensile strength of 5070 p.s.i., an elongation of 530%, a Mooney viscosity ML–4' at 212° F. of 94.8, a Shore A hardness of 72.3, and a percentage rebound of 51.9.

EXAMPLE 21

A cured rubber vulcanizate is produced according to Example 19 with the exception that, for the carbon black utilized therein, 50 parts by weight of carbon black manufactured as described in Example 3 is employed herein. Measurements on this vulcanizate reveals a Mooney viscosity ML-4' of 86.4 at 212° F., a tensile strength of 4710 p.s.i., a 300% modulus of 2740 p.s.i., an elongation of 480%, a Shore hardness of 70.5 and a percentage rebound of 55.6

EXAMPLE 22

In accordance with the procedure of Example 19, a vulcanizate is prepared utilizing 50 parts by weight of the carbon black of Example 4. Testing of the vulcanizate reveals a 300% modulus of 2990 p.s.i., a tensile strength of 4680 p.s.i., an elongation of 450%, and a Mooney viscosity ML-4' at 212° F. of 88.1.

EXAMPLE 23

One hundred parts by weight of a copolymer of 23.5 parts styrene and 76.5 parts butadiene, 3 parts by weight of zinc oxide, 1.5 parts by weight of stearic acid, 8 parts by weight of softener mix, 1.75 parts by weight of sulfur, 1.0 parts by weight of Flexamine, 1.25 parts by weight of Santocure (CBS) and 50 parts by weight of the carbon black product described in Example 5 are mixed on a roll mill to a homogeneous blend. The resulting compound is then cured at 293° F. for a period of 40 minutes. Testing of the blend for conventional rubber properties reveals a value for Mooney viscosity ML-4' at 212° F. of 66, a tensile strength of 4020 p.s.i., a 300% modulus of 2720 p.s.i., an elongation of 440% and a Shore A hardness of 71. With regard to this formulation, the softener mix comprises equal portions of naphthenic oil sold under the trade designation Circosol 42 XH by Sun Oil Company and a saturated polymeric petroleum hydrocarbon sold under the trade name Paraplex by C. P. Hall Company. Flexamine is the trade designation of an antioxidant sold by U.S. Rubber Company. Santocure (CBS) is the trade designation for N-cyclohexyl-2-benzothiazole-sulfenamide, a curing agent for rubber systems.

EXAMPLE 24

Following the procedure of Example 23, there is prepared a cured rubber vulcanizate using, in lieu of the carbon black employed therein, 50 parts by weight of the carbon black of Example 6. The vulcanizate cured at 293° F. for 50 minutes is characterized by having a 300% modulus of 2800 p.s.i., a tensile strength of 3840 p.s.i., an elongation of 390%, a Shore A hardness of 69, Mooney viscosity ML-4' at 212° F. of 96, and a percentage rebound of 49.2.

EXAMPLE 25

In accordance with the procedure of Example 19, a vulcanizate is prepared using 50 parts by weight of the high structure HAF type black of Example 7. The resulting vulcanizate is determined to have a 300% modulus of 3256 p.s.i., a tensile strength of 4851 p.s.i., and a Mooney viscosity ML-4' at 212° F. of 92.6.

EXAMPLE 26

Using the high structure ISAF type black of Example 8, there is prepared, pursuant to the procedure of Example 19, a rubber vulcanizate having a 300% modulus of 3196 p.s.i., a tensile strength of 4721 p.s.i., and a Mooney viscosity ML-4' at 212° F. of 99.2.

EXAMPLE 27

Following the procedure of Example 19, a vulcanizate is prepared utilizing the high structure SAF type black of Example 9 described hereinbefore. Testing reveals this vulcanizate to be characterized by having a 300% modulus of 3016 p.s.i., a tensile strength of 5026 p.s.i., and a Mooney viscosity ML-4' at 212° F. of 105.

EXAMPLE 28

For purposes of determining roadwear ratings, rubber vulcanizates of the formulation described fully hereinbefore are prepared utilizing each of the blacks prepared in Examples 1 through 4 and 7 through 9. Roadwear data on rubber vulcanizates prepared using the blacks of Examples 5 and 6 was not available. Moreover, as mentioned in the test procedures for determining roadwear ratings, the results are reported in the following Table I relative to Cabot's standard ISAF type black which is arbitrarily assigned a roadwear rating of 100 percent.

TABLE I

| Carbon black sample | Representative type of carbon black | Roadwear, rating relative to Cabot's standard ISAF black, percent | (1) |
|---|---|---|---|
| Example: | | | |
| 1 | ISAF | 103 | 325 |
| 2 | SAF | 105 | 323 |
| 3 | Vulcan 5H* | 102 | 327 |
| 4 | HAF-HS | 98.5 | 323 |
| 7 | HAF-HS | 106 | 336 |
| 8 | ISAF-HS | 117 | 336 |
| 9 | SAF-HS | 112 | 350 |
| Vulcan: | | | |
| 3* | HAF | 86 | 284 |
| 3H* | HAF-HS | 93 | 291 |
| 5H* | | 98 | 304 |
| 6* | ISAF | 100 | 291 |
| 6H* | ISAF-HS | 102 | 302 |
| 9* | SAF | 102 | 300 |
| 9H* | SAF-HS | 103 | 286 |

$$1 \left[ \text{Tinting strength} + \frac{0.6(2270 + 63.5 \text{DBP})}{I_2 SA} \right]$$

*Carbon blacks made and sold by Cabot Corporation.

It will be seen from the data presented in the above Table I that carbon blacks conventionally made and sold by Cabot Corporation for use in rubber as reinforcements, bearing the trade name designations of Vulcan 3 through Vulcan 9H carbon blacks, cover the range of HAF type blacks through high structure SAF type blacks. As shown in the table, the roadwear ratings for these conventionally available rubber-reinforcing blacks ranges from a low of 86% to a high of 103% and further that these blacks are characterized by analytical properties which when calculated in accordance with the tint factor relationship of $$\left[ \text{tinting strength} + \frac{0.6(2270 + 63.5 \text{ DBP})}{I_2 SA} \right]$$

yields values for the tint factor of about 300. Quite unexpectedly, it has now been shown, as in the case of the blacks of Examples 1, 2, 3 and 4, that the blacks of the present invention, having iodine surface areas similar to the conventional blacks, demonstrate superior roadwear ratings. While this superior treadwear rating is exemplified in the case of the blacks having high tint factors, as calculated above, it is particularly evidenced by the blacks of Examples 7, 8 and 9 where treadwear ratings are about 10 to 15% higher than the closest available blacks conventionally made and sold by Cabot Corporation. This dramatic increase in treadwear ratings which is considered extremely significant by those skilled in the art is characteristic of the blacks of the present invention having tint factors of at least about 335. It has been found, therefore, that it is preferred to employ blacks having the highest available tint factors for a given iodine surface area since such blacks will normally impart to the rubber compositions the strongest reinforcing properties as well as imparting good performance characteristics to treadstocks. For example, in the case of HAF-HS type blacks as shown above, the conventional Vulcan 3H carbon black, having an iodine surface area of 70 m.²/g. and a tint factor of less than 300, has a treadwear rating of 93%; a similar HAF-HS type black, as shown in Example 4 of of the present invention, having a similar iodine surface area, i.e., 72 m.²/g., but having a tint factor of 323, is now shown to have a treadwear rating of 98.5% which is a highly desirable increase compared to the conventional counterpart;

and another similar HAF-HS type black, as represented in Example 7 of the instant application, having also an iodine surface area of 72 m.²/g., but having a tint factor of 336, possesses a treadwear rating of 106% which is a 13% increase compared to the conventional counterpart black. From data of this type, it is clear that blacks of similar iodine surface areas will be stronger wearing blacks as the tint factor for such blacks is increased to higher values.

In order to present a more convenient comparison of the use of the blacks of this invention as rubber blacks with the conventional rubber grade carbon blacks produced and sold by Cabot Corporation, there are presented the following three tables. In Table II there is shown for each of the blacks therein a summary of analytical properties. The data on the more important physical properties attributable to the use of each of the blacks in both natural rubber and industry synthetic rubber formulations are presented in Tables III and IV hereinbelow. The data concerning the conventional rubber grade carbon blacks is published and distributed widely by Cabot Corporation and particular emphasis has been placed herein on Technical Report RG-130 entitled "Cabot Carbon Blacks in a Variety of Elastomers," published by Cabot Corporation in January 1970. In this technical report, on pages 4 and 6, there is disclosed values for the physical properties of natural and synthetic rubber (SBR) formulations containing all of the conventionally available rubber blacks. It is this data which is reproduced in Tables III and IV for each of the conventional blacks regarded herein as control blacks. In addition, there is included in Tables II, III and IV data on Industry Reference Black No. 3 (hereinafter referred to as IRB No. 3) inasmuch as this black has been the accepted reference black since June 1970. The data on IRB No. 3 reproduced hereinbelow is found in Technical Service Report TG-70-1 entitled "Iudustry Reference Black No. 3," written by Messrs. Juengel and O'Brien and published by Cabot Corporation on Apr. 1, 1970. Finally, it will be noted that the analytical and physical properties of the blacks of the present invention as described in the following tables have been disclosed in the examples of this application.

TABLE II

| Carbon black sample | Representative type of carbon black | Iodine surface area, m.²/g. | Tinting strength, percent | DBP absorption, cc./100 g. |
|---|---|---|---|---|
| Example: | | | | |
| 1 | ISAF | 101 | 268 | 115 |
| 2 | SAF | 116 | 275 | 112 |
| 3 | Vulcan 5H* | 81 | 252 | 123 |
| 4 | HAF-HS | 72 | 235 | 131 |
| 7 | HAF-HS | 72 | 242 | 142 |
| 8 | ISAF-HS | 99 | 267 | 144 |
| 9 | SAF-HS | 120 | 295 | 137 |
| Vulcan: | | | | |
| 3* | HAF | 65 | 203 | 102 |
| 3H* | HAF-HS | 70 | 205 | 122 |
| 5H* | | 80 | 225 | 130 |
| 6* | ISAF | 98 | 232 | 115 |
| 6H* | ISAF-HS | 104 | 243 | 126 |
| 9* | SAF | 114 | 250 | 114 |
| 9H* | SAF-HS | 118 | 231 | 135 |
| IRB No. 3 | HAF | 67 | 208 | 100 |

*Carbon blacks made and sold by Cabot Corporation.

In regard to the above Table II, it is to be noted that an attempt has been made to compare the novel rubber reinforcing blacks of the present invention with conventionally available blacks which are as similar as possible in all respects. In selecting the control blacks, accordingly, there has been provided a representative group of available blacks made and sold by Cabot Corporation under the trade name, Vulcan, which are similar in respect to iodine surface areas and, if required, structure levels as measured by DBP absorption values. This listing of blacks is sufficiently representative to permit an effective evaluation thereof in the reinforcement of natural and synthetic rubber formulations as demonstrated in Tables III and IV.

TABLE III

Physical properties of natural rubber vulcanizates containing blacks of Table II

| Carbon black sample | Representative type of carbon black | Tensile, p.s.i. | 300% modulus, p.s.i. | Elongation at break, percent | Shore A hardness |
|---|---|---|---|---|---|
| Example: | | | | | |
| 1 | ISAF | 4,560 | 2,660 | 495 | 73 |
| 2 | SAF | 4,240 | 2,110 | 540 | 66 |
| 3 | Vulcan 5H* | 4,280 | 2,840 | 440 | 73 |
| 4 | HAF-NS | 4,030 | 2,820 | 420 | 68 |
| 7 | HAF-HS | 4,157 | 2,810 | | |
| 8 | ISAF-HS | 4,407 | 2,780 | | |
| 9 | SAF-HS | 4,397 | 2,525 | | |
| Vulcan: | | | | | |
| 3* | HAF | 4,000 | 2,400 | 470 | 65 |
| 3H* | HAF-HS | 3,850 | 2,600 | 460 | 67 |
| 5H* | | 3,850 | 2,550 | 480 | 67 |
| 6* | ISAF | 4,075 | 2,300 | 530 | 66 |
| 6H* | ISAF-HS | 4,100 | 2,500 | 490 | 67 |
| 9* | SAF | 4,400 | 2,250 | 530 | 66 |
| 9H* | SAF-HS | 4,150 | 2,550 | 510 | 68 |
| IRB No. 3 | HAF | 4,137 | 2,300 | 495 | 67 |

*Carbon blacks made and sold by Cabot Corporation.

A study of the data presented above reveals that the blacks of the present invention are indeed effective in reinforcing natural rubber vulcanizates. While the elongation and hardness properties of the vulcanizates are similar, it is apparent that the tensile strength and modulus properties of the vulcanizates containing the blacks of the present invention are superior to those of the vulcanizates prepared with the similar conventionally available blacks.

TABLE IV

Physical properties of industry synthetic rubber (SBR) vulcanizates containing blacks of Table II

| Carbon black sample | Representative type of carbon black | Tensile, p.s.i. | 300% modulus, p.s.i. | Elongation at break, percent | Shore A hardness |
|---|---|---|---|---|---|
| Example | | | | | |
| 1 | ISAF | 4,980 | 2,360 | 540 | 74 |
| 2 | SAF | 5,070 | 2,410 | 530 | 72 |
| 3 | Vulcan 5H* | 4,710 | 2,740 | 480 | 71 |
| 4 | HAF-HS | 4,680 | 2,990 | 450 | |
| 7 | HAF-HS | 4,851 | 3,256 | | |
| 8 | ISAF-HS | 4,721 | 3,196 | | |
| 9 | SAF-HS | 5,026 | 3,016 | | |
| Vulcan: | | | | | |
| 3* | HAF | 4,050 | 2,450 | 500 | 67 |
| 3H* | HAF-HS | 3,950 | 2,800 | 470 | 69 |
| 5H* | | 4,050 | 2,750 | 470 | 69 |
| 6* | ISAF | 4,250 | 2,550 | 520 | 68 |
| 6H* | ISAF-HS | 4,150 | 2,750 | 490 | 69 |
| 9* | SAF | 4,700 | 2,600 | 510 | 69 |
| 9H* | SAF-HS | 4,500 | 2,800 | 490 | 71 |
| IRB No. 3 | HAF | 4,251 | 2,456 | 483 | 70 |

*Carbon blacks made and sold by Cabot Corporation.

An examination of the above results reveals that, as in the case of natural rubber vulcanizates, the physical properties of elongation and hardness are approximately equivalent whether the blacks of the present invention of the conventional rubber grade blacks are utilized in reinforcing industry synthetic rubber (SBR) formulations. However, in the reinforcement of industry synthetic rubber formulations it becomes readily apparent that marked improvements in tensile strength ranging from about 300 to about 800 p.s.i. are achieved by the incorporation as reinforcements of the blacks of the present invention than the conventional rubber grade blacks.

It is, thus, readily apparent from the foregoing results that the novel group of carbon blacks disclosed herein impart to natural and synthetic rubber compositions extremely desirable properties and therefore constitute a valuable group of effective reinforcing carbon blacks for rubber systems. For example, it has been shown in Tables III and IV that the present novel class of carbon blacks are effective in imparting to rubber compositions properties such as tensile strength and modulus which are superior in comparison to conventional carbon blacks. Additionally, it has been clearly proven, as shown in Table I, that the blacks of the present invention are utilized successfully in the preparation of treadstocks having treadwear ratings unexpectedly higher than in the instances where conventional rubber grade blacks are employed.

Moreover, it has been found that, while these properties are achieved, other desirable processing characteristics of the rubber compositions of the present invention are not unduly affected by the incorporation of the novel carbon blacks in the rubber compositions of this invention.

Numerous chemical curing systems have been found useful in promoting the interaction of the carbon black reinforcement and the natural or synthetic rubber in practicing the present invention. Exemplary of the chemical curing agents are mercaptobenzothiazyl disulfide (MBTS), N-cyclohexyl-2-benzothiazole-sulfenamide and tetramethylthiuramdisulfide (TMTD). Furthermore, for many purposes, it may be desirable to compound the rubber compositions of the present invention with other conventional rubber additives. Illustrative of such additives are other materials such as titanium dioxide, silicon dioxide, zinc oxide, calcium carbonate, clays, calcium silicate, zinc sulfide, hydrous alumina and calcined magnesia; thermoplastic resins such as polyvinyl chloride and epoxy resins as compounding substances; vulcanizing agents; vulcanization accelerators; accelerator activators, sulfur curatives; antioxidants; decelerators; heat stabilizers; plasticizers, softeners or extender oils such as mineral oil, resins, fats, waxes, petroleum distillates, vegetable oils, e.g., linseed oil and soybean oil, butyl Cellosolve pelargonate, di-n-hexyl adipate, trioctyl phosphate, chlorinated hydrocarbons, ether, ketones, terpenes, gum turpentine, rosin, pine tar, coal tar products including alkyl naphthalenes and polynuclear aromatics and liquid polymers of conjugated dienes; and the like. It will be apparent that compositions containing such other additives are within the scope of this invention.

For further information regarding the novel carbon blacks per se characterized by the unique tint per unit surface area relationship, reference is made to our copending application Ser. No. 123,081, filed Mar. 10, 1971, now U.S. Pat. No. 3,725,103.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a rubber selected from the group consisting of natural and synthetic rubbers and a carbon black product selected from the group consisting of furnace-type carbon blacks characterized by having a tinting strength of at least about 200 percent, a pH value of at least 4, and a value for the tint factor relationship of [tinting strength+$0.6(D_a)$], wherein $D_a$ is apparent diameter, of at least about 317, wherein the carbon black product is present in amounts of from about 10 to about 250 parts by weight per 100 parts by weight of rubber.

2. A composition as defined in Claim 1 wherein the rubber is natural rubber.

3. A composition as defined in Claim 1 wherein the rubber is synthetic rubber.

4. A composition as defined in Claim 1 wherein the carbon black product is present in amounts of from about 20 to about 100 parts by weight per 100 parts by weight of rubber.

5. A composition as defined in Claim 1 wherein the carbon black product is present in amounts of from about 40 to about 80 parts by weight per 100 parts by weight of rubber.

6. A composition as defined in Claim 1 wherein the furnace-type carbon black product has a tinting strength of at least 220 percent.

7. A composition as defined in Claim 1 wherein the furnace-type carbon black product has a tinting strength ranging from about 220 to about 290 percent.

8. A composition as defined in Claim 1 wherein the furnace-type carbon black product has a tinting strength ranging from about 230 to about 275 percent.

9. A composition as defined in Claim 1 wherein the furnace-type carbon black product has a value for the tint factor relationship of [tinting strength+$0.6(D_a)$], wherein $D_a$ is apparent diameter, of at least about 320.

10. A composition as defined in Claim 1 wherein the furnace-type carbon black product has a value for the tint factor relationship of [tinting strength+$0.6(D_a)$], wherein $D_a$ is apparent diameter, of at least about 335.

References Cited
UNITED STATES PATENTS

| | | | |
|---|---|---|---|
| 3,443,901 | 5/1969 | Wendell et al. | 260—41.5 R |
| 3,595,618 | 6/1971 | Kiyonaga et al. | 260—41.5 R |
| 3,619,140 | 11/1971 | Morgan et al. | 260—41.5 R |
| 3,725,103 | 4/1973 | Jordan et al. | 106—307 |

MORRIS LIEBMAN, Primary Examiner

H. H. FLETCHER, Assistant Examiner

U.S. Cl. X.R.

106—307; 260—42.32, 42.33, 42.34, 42.47, 763; 423—445, 450, 453, 455, 458, 460